F. B. CARLISLE.
TIRE VALVE.
APPLICATION FILED JULY 31, 1911.

1,076,267.

Patented Oct. 21, 1913.

Witnesses:
Jas. J. Maloney.

Inventor:
Fred B. Carlisle.
by H. Livermore
Atty.

UNITED STATES PATENT OFFICE.

FRED B. CARLISLE, OF MALDEN, MASSACHUSETTS, ASSIGNOR TO STANDARD AUTO VALVE COMPANY, A CORPORATION OF MASSACHUSETTS.

TIRE-VALVE.

1,076,267. Specification of Letters Patent. Patented Oct. 21, 1913.

Application filed July 31, 1911. Serial No. 641,399.

*To all whom it may concern:*

Be it known that I, FRED B. CARLISLE, a citizen of the United States, residing in Malden, in the county of Middlesex and State of Massachusetts, have invented an Improvement in Tire-Valves, of which the following description, in connection with the accompanying drawings, is a specification, like letters on the drawings representing like parts.

The present invention relates to a tire valve, and is embodied in a valve having the general characteristics of the valve shown and described in Letters Patent of the United States No. 991,949, dated May 9, 1911.

The present invention mainly resides in certain improved features of construction and arrangement, the principal feature of the invention consisting in a construction of the valve which admits of the removal of the valve stem and the valve itself from the retaining device, whereby the valve, when assembled, is held in the opening in the tire with an air tight fit. This feature of the invention is of material importance, since it admits of the removal of all the vital parts of the valve for inspection or repair, without pulling out the flanged portion from the interior of the tire or tube, which is not only difficult but detrimental in that the rubber is unduly stretched and may be torn.

A further feature of the invention consists in novel means for guiding the valve proper in its movement to and from its seat, and in the arrangement of the spring which is employed to seat the valve before the pressure behind the valve accumulates to a sufficient extent to hold the valve firmly seated.

Figure 1:
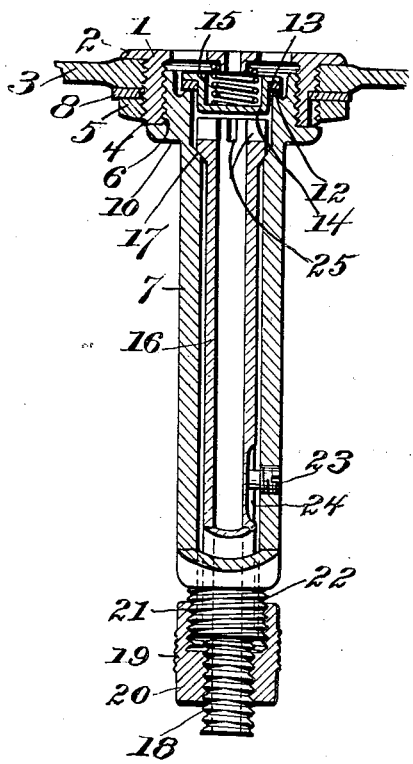
Figure 2:
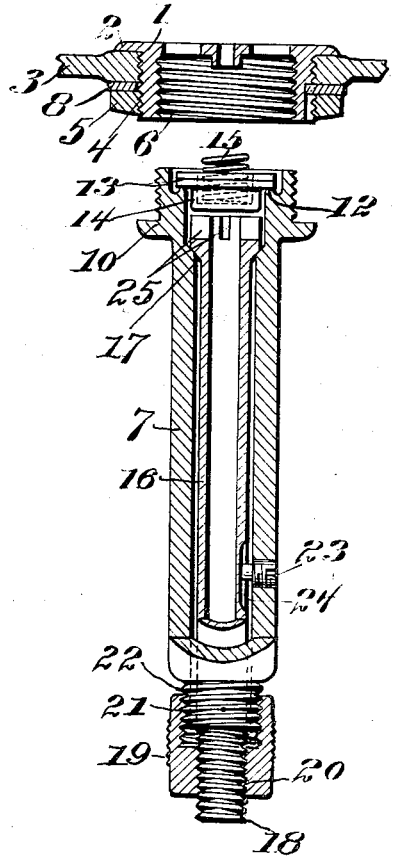

Figure 1 is a longitudinal section of a valve embodying the invention shown as applied to the inner tube of the tire, the entire device being assembled and in condition for use; and Fig. 2 is a similar view showing the valve proper disconnected from the flanged clamp by which the valve is connected with the tube.

In accordance with the invention, the base or clamping portion of the valve consists of a member 1 which is tubular or cup-shaped and provided with a flange 2 adapted to engage the inner surface of the tube 3, the said cup-shaped member having an external screw thread 4, to receive a clamping ring 5 at the outside of the tube, and an internal screw thread 6, to receive the main body 7 of the valve. As best shown in Fig. 2, the member 1 is securely clamped in the tube, there being preferably a washer 8 interposed between the clamping ring 5 and the outside of the tube 3, and this member can remain permanently connected with the tube, even if the valve itself is to be repaired or replaced. The valve member 7 consists of a tube enlarged at one end and provided with an external screw thread to coöperate with the internal thread 6 of the member 1, the tube 7 also having a flange 10 to form a bearing so that the two parts can be tightly screwed together and properly positioned with relation to each other. The interior of the tube 7 is enlarged at the end nearest the tube 3 and provided with an enlarged valve seat 12 against which bears a mushroom valve 13, the tongue 14 of which enters the enlarged portion of the tube and is guided and positioned thereby. The said tongue is made in the form of a cup and thereby forms a seat for a spring 15 which bears against the middle portion of the member 1, the said middle portion being in the form of a spider so as to afford a support for the spring and at the same time afford openings for air entering the tire through the tube 7.

The tube 7 is shown as provided with a longitudinally movable concentric tubular member 16 having an annular valve seat 17 formed in its lower end adapted to engage with the wall of the tube 7 where the diameter thereof is decreased, the two parts together forming a valve which closes the slight annular space between the tube 7 and the tube 16. The said tube 16 is provided at its upper end with an external screw thread 18 of the proper size to receive the ordinary pump nipple and dust cap, this tube being used for inflating the tire, the air passing through the tube in the space between the lower end thereof and the valve member 13, the pressure of the incoming air unseating the valve and allowing the compressed air to flow into the tire.

The tube 16 is held in the position shown in Fig. 1 by means of a double threaded member 19 having internal threads 20 and 21 cut in opposite directions and engaging the threads 18 and threads 22 cut on the outside of the tube 7. This construction remains substantially the same as that shown and described in United States Letters Patent No. 991,949 above referred to. The tubes 7 and 16 are prevented from rotation with relation to each other by means of a pin 23 secured in the wall of the tube 7 entering a slot 24 in the external wall of the tube 16. This construction admits of the deflation of the tire through the longitudinal movement of the tube 16 with relation to the tube 7, substantially as described in the aforesaid prior patent, the lower end of the tube 16, however, being enlarged so as to engage substantially the entire surface of the valve 13, the said enlarged portion being provided with transverse slots 25 to admit of the escape of air, in deflating, into the tube 16.

What I claim is:

1. The combination with a flanged base portion adapted to be secured in a tire; of a separate and complete valve member adapted to be detachably secured to said base portion, said valve member comprising a tube having an external valve seat at one end; a valve coöperating with said seat located outside of the tube and having a guide tongue extending into said tube; a spring located between said valve and said base portion; and a longitudinally movable deflating member in said tube to unseat said valve.

2. The combination with a flanged base portion adapted to be secured in a tire; of a valve member adapted to be detachably secured to said base portion, said valve member comprising a tube having an external valve seat; a valve coöperating with said seat and having a guide tongue extending into said tube, said guide tongue being cupped to form a spring seat; and a spiral spring located between said seat and the base portion.

3. The combination with a flanged base portion adapted to be secured in a tire; of a valve member comprising a tube having an external valve seat; a valve coöperating with said seat and having a guide tongue extending into said tube, said guide tongue being cupped to form a spring seat; a spiral spring located between said seat and the base portion; a tubular member located in said tube and provided with a pump nipple; an annular external valve member on said tubular member coöperating with a similar internal valve member in the main valve tube, said tubular member being provided with lateral slots in its lower end; and means for producing a longitudinal movement of said tubular member to unseat the valve and open communication between the compressed air space and the tubular member by way of said slots for the purpose of deflating.

4. The combination with a flanged base portion adapted to be secured in a tire; of a valve adapted to be detachably secured to said base portion, said valve comprising a tube having an external valve seat; a valve coöperating with said seat and having a guide tongue extending into said tube, said guide tongue being cupped to form a spring seat; and a spiral spring located between said seat and the base portion.

In testimony whereof, I have signed my name to this specification in the presence of two subscribing witnesses.

FRED B. CARLISLE.

Witnesses:
 JAS. J. MALONEY,
 W. E. COVENLY.